United States Patent
Yu (10) Patent No.: US 6,313,928 B1
(45) Date of Patent: Nov. 6, 2001

(54) DOCUMENT SIZE DETECTION DEVICE AND METHOD FOR A FACSIMILE APPARATUS

(75) Inventor: Sang-Yun Yu, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/062,722

(22) Filed: Apr. 20, 1998

(30) Foreign Application Priority Data

Apr. 18, 1997 (KR) .................................... 97-14524

(51) Int. Cl.⁷ ...................................... H04N 1/04
(52) U.S. Cl. ............................... 358/488; 358/498
(58) Field of Search ..................... 358/488, 449, 358/498, 496, 497, 401, 494, 474; 271/3.13, 265.02; 399/370

(56) References Cited

U.S. PATENT DOCUMENTS

| | | | |
|---|---|---|---|
| 4,647,188 | * 3/1987 | Komiya et al. | 355/55 |
| 5,119,130 | 6/1992 | Tsudaka et al. | |
| 5,198,853 | 3/1993 | Ichihara et al. | |
| 5,206,744 | 4/1993 | Kamada et al. | |
| 5,218,408 | 6/1993 | Inada et al. | |
| 5,236,072 | 8/1993 | Cargill | |
| 5,414,522 | 5/1995 | Moriya | |
| 5,500,725 | 3/1996 | Takasu et al. | |
| 5,519,483 | * 5/1996 | Kawanishi et al. | 355/75 |
| 5,541,713 | 7/1996 | Takatsuki et al. | |
| 5,563,699 | 10/1996 | Tsukamotor | |
| 5,568,281 | 10/1996 | Kochis et al. | |
| 5,596,399 | * 1/1997 | Dempsey et al. | 399/45 |
| 5,602,651 | 2/1997 | Tabata et al. | |
| 5,805,308 | * 9/1998 | Tanaka et al. | 358/486 |
| 5,946,527 | * 8/1999 | Salgado et al. | 399/370 |

FOREIGN PATENT DOCUMENTS 59-88757   5/1984   (JP) .

* cited by examiner

*Primary Examiner*—Cheukfan Lee
(74) *Attorney, Agent, or Firm*—Robert E. Bushnell, Esq.

(57) ABSTRACT

A document size detection device accurately detects document size while reducing the number of document size detection sensors required. The device includes: a document detection sensor positioned at a first location on a document insertion line across a document feed path, the first location being positioned within the width of a first-sized document; a document position sensor positioned at a second location on a scan stand-by line across the document feed path, the second location being positioned within the width of the first-sized document; a document size detection sensor positioned at a third location between the document insertion line and the scan stand-by line, and within an area formed between lateral boundaries of the first-sized document and a second-sized document; a document feed roller for feeding the document; and a controller for driving the document feed roller to feed the document up to the scan stand-by line if the document detection sensor detects the document. The controller determines the document to be a first-sized document if the document size detection sensor fails to detect the document, and determines the document to be the second-sized document if the document size detection sensor detects the document.

18 Claims, 5 Drawing Sheets

DOCUMENT SIZE DETECTION DEVICE AND METHOD FOR A FACSIMILE APPARATUS

CLAIM OF PRIORITY

This application makes reference to, incorporates the same herein, and claims all benefits accruing under 35 U.S.C. §119 from an application for DOCUMENT SIZE DETECTION DEVICE FOR FACSIMILE APPARATUS earlier filed in the Korean Industrial Property Office on the 18$^{th}$ of Apr. 1997 and there duly assigned Ser. No. 14524/1997.

BACKGROUND OF THE INVENTION

1. Technical Field

The present invention relates to a facsimile apparatus and method, and in particular, to a device and method for accurately detecting a document size.

2. Related Art

In general, facsimile machines employ scanners which can scan a document of one size or the other (for example, A4 size, B4 size or A3 size). Thus, when transmitting a B4-size document, a facsimile typically tracks to determine whether the called facsimile will be able to receive a B4-size document. If the called facsimile cannot receive such a size document, the sending facsimile scales down the image scanned in B4 size to an image in A4 size before transmitting the scanned image. Thus, in order to prevent unnecessary scanning and unnecessary downscaling, it is necessary for such a facsimile to first detect the document size prior to scanning the actual document area.

However,. when a plurality of documents of different sizes are inserted continuously into a facsimile apparatus, the facsimile cannot detect accurate sizes for each individual document. That is to say, if as an example, A4-size documents and B4-size documents are inserted continuously and in mixed fashion, the composition and operation of facsimile machine is such that the central processing unit (CPU) of the facsimile machine controls the scanner to scan the area corresponding to a B4-size document even though a A4-size document is in position for scanning. This is complicated by the fact that, if called facsimile cannot receive a B4-size document, the facsimile machine scales down the scanned image before transmitting it to the called facsimile.

Thus, there is a problem with such facsimile apparatus in that, in such situations, the CPU can misrecognize the A4-size document for a B4-size document, and scan an area corresponding to the B4-size document even though the document being scanned is of A4-size. Moreover, the scanner scans unnecessary area, and often unnecessarily scales down the scanned image before transmitting if the called facsimile cannot receive a certain size document.

Improved facsimile machines could be provided with additional scanners, and in particular with one scanner for each type or size of document to be scanned. However, this causes unnecessary increase in the cost of the facsimile.

Therefore, there is a need in the prior art for the development of a scanner which can scan a mixture of different size documents without misrecognizing the size of the documents, and which does not unnecessarily scale down images for called facsimiles which do not have the capability of receiving certain size documents. Furthermore, there is a need for the development of a facsimile machine which is not burdened by these disadvantages, but which also does not have an increased cost due to the provision of duplicate scanners for different size documents.

The following patents are considered to be representative of the prior art, and are burdened by the disadvantages set forth herein: U.S. Pat. No. 5,236,072 to Cargill, entitled Document Size Detection Device, U.S. Pat. No. 5,218,408 to Inada et al., entitled Image Forming Apparatus With Photosensors For Detecting Original Size, U.S. Pat. No. 5,500,725 to Takasu et al., entitled Original Document Reading Device Capable Of Automatically Detecting The Size Of An Original Document, U.S. Pat. No. 5,206,744 to Kamada et al., entitled Document Scanning Apparatus Having Image Signal Correcting Capability, U.S. Pat. No. 5,563,699 to Tsukamoto, entitled Document Feeder Which Determines A Document Path Using A Determined Page Length, U.S. Pat. No. 5,541,713 to Takatuski et al., entitled Device For Estimating A Size Of An Original Document, U.S. Pat. No. 5,602,651 to Tabata et al., entitled Image Recording Apparatus, U.S. Pat. No. 5,414,522 to Moriya, entitled Image Reading Apparatus Which Detects Document Size, U.S. Pat. No. 5,119,130 to Tsudaka et al., entitled Document Size Detecting Device, U.S. Pat. No. 5,198,853 to Ichihara et al., entitled Document Size Detection Apparatus, U.S. Pat. No. 5,568,281 to Kochis et al., entitled Automatic Document Presence,. Skew And Width Detection Method And Apparatus For A Document Scanner, and Japanese Patent No. 59-88757 to Tachikawa, entitled Electrophotographic Device.

SUMMARY OF THE INVENTION

It is, therefore, an object of the present invention to provide a document size detection device and method, the device having document size detection sensors which are reduced in number, and which are capable of accurately detecting the document size.

The above object is achieved by providing a document size detection device which includes: a document detection sensor positioned at a first place on a document insertion line across a document feed path, the first place being positioned within the width of a first-sized document; a document position sensor positioned at a second place on a scan stand-by line across the document feed path, the second place being positioned within the width of the first-sized document; a document size detection sensor positioned at a third place between the document insertion line and the scan stand-by line, within an area formed between lateral boundaries of the first-sized document and a second-sized document; a document feed roller for feeding the document; and a controller for driving the document feed roller to feed the document up to the scan stand-by line if the document detection sensor detects the document. The controller determines that the document is a first-sized document if the document size detection sensor fails to detect the document, and determines that the document is a second-sized document if the document size detection sensor detects the document.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail referring to the attached drawings. Though the specific embodiment will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 1:
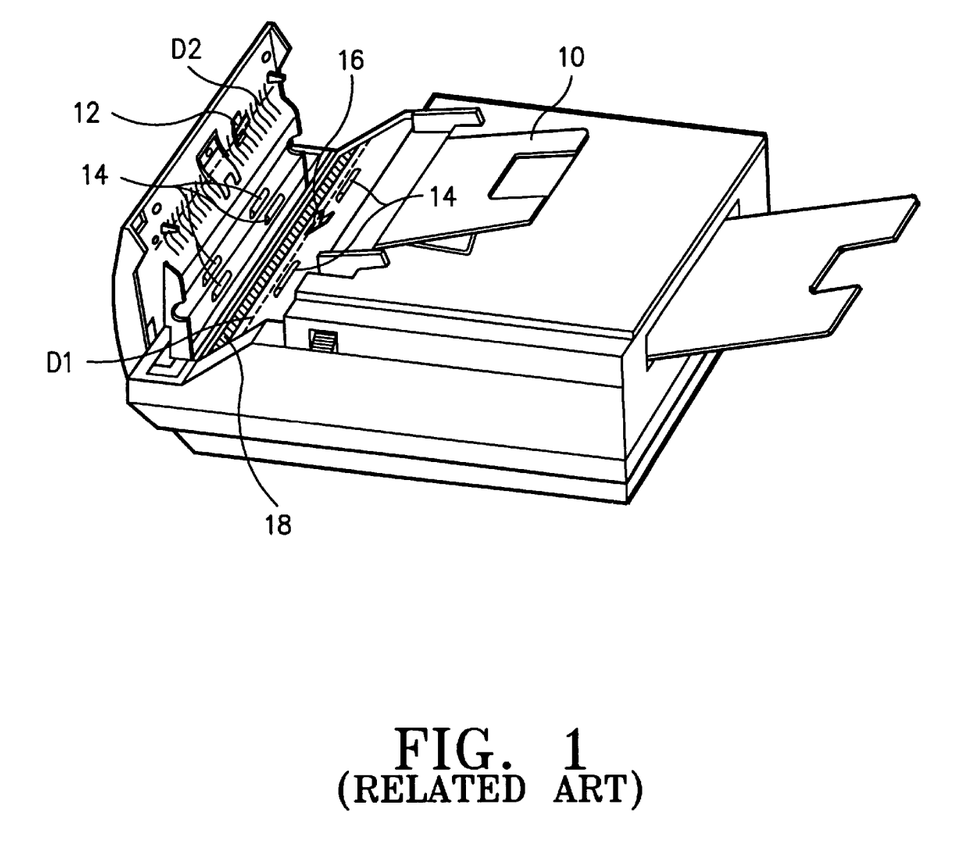
FIG. 1 is a perspective view of a facsimile apparatus.

FIG. 1 illustrates a perspective view of a general facsimile. In scanning a document, as a document detection sensor 12 detects a document placed on a document tray 10, a central processing unit (CPU) not shown in FIG. 1 drives a main motor (not shown) to drive a document feed roller 14 so as to feed the document up to a scan stand-by line indicated by a dotted line D1 in FIG. 1. If a document position sensor 16 mounted at the scan stand-by line D1 detects the document being fed, the CPU stops driving the main motor, and thereby stops feeding the document. Then, the CPU checks whether or not a user has depressed a document transmission key or a copy key through an operating panel equipment (OPE) not shown. If the document transmission key or the copy key is depressed, the CPU drives the main motor and a scanner to feed the document to an image sensor 18 of the scanner. Then, the image sensor 18 of the scanner begins to scan the document being fed in.

In general the scanner of such a facsimile can scan a document of A4 size (210×297 mm) only, so that the facsimile can transmit and copy the document of A4 size only. Accordingly, the facsimile includes a scanner which can scan the document of B4 (257×297 mm) or A3 size (297×420 mm) in order to transmit and copy the document of B4 or A3 size.

For example, when transmitting the B4-size document, the facsimile checks in advance whether or not a called facsimile can receive the B4-size document. If the called facsimile cannot receive the B4-size document, the facsimile scales down the image scanned in B4 size to the image in A4 size before transmitting the scanned image. However, if the called facsimile can received the B4-size document, the facsimile transmits the image scanned in B4 size to the called facsimile without downscaling. In order to prevent unnecessary scanning and unnecessary downscaling, such a facsimile first detects the document size to scan the actual document area only.

Figure 2:
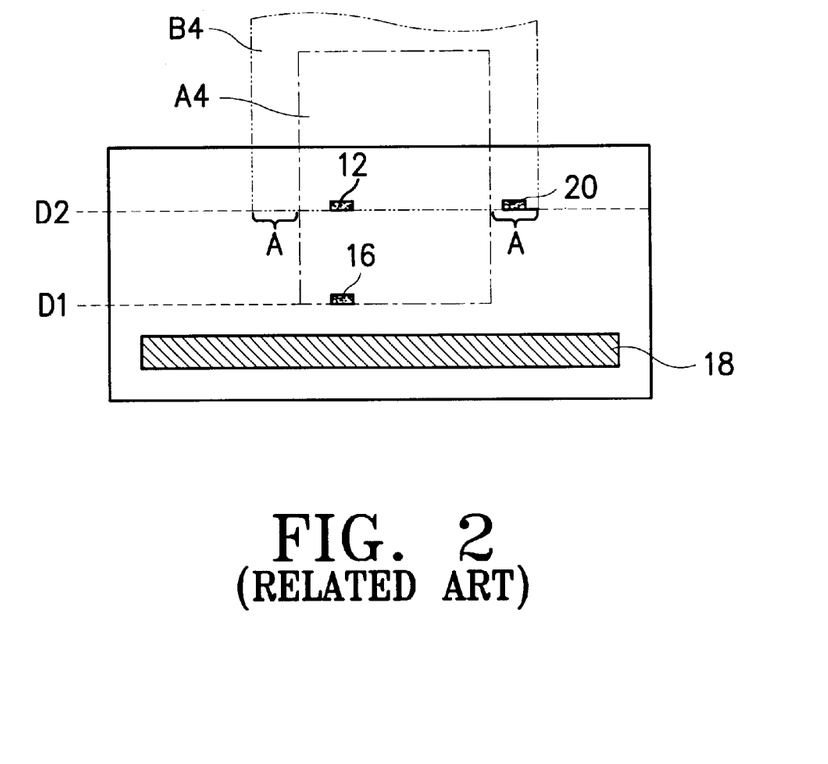
FIGS. 2 and 3 are diagrams of a document size detection device.

A detail description will now be made with respect to a document size detecting operation of a facsimile which can scan a document smaller than B4 size. FIG. 2 illustrates a document feed path of a facsimile including a document size detection sensor for detecting the document size. As illustrated, a B4 size document sensor 20 is positioned at a place A on a document insertion line D2, between lateral boundaries of the A4-size document and the B4-size document. If a document larger than A4 but slightly smaller than B4 is inserted, the B4-size document sensor 20 takes the inserted document for the B4-size document. Upon detecting the B4-size document, the CPU of the facsimile controls the scanner to scan only the area corresponding to the B4-size document. Similarly, upon detecting an A4-size document, the scanner scans an area corresponding to the A4-size document.

Furthermore, by installing an A3-size document sensor in the above described manner, the facsimile includes a scanner capable of scanning the document smaller than A3 size and can detect the A3-size document.

However, when a plurality of documents in different sizes are inserted continuously, the facsimile cannot detect accurate sizes for the individual documents. That is, if a small-sized document from among different sized documents is first inserted, the facsimile cannot detect the size of the small-sized document.

For example, on the assumption that the A4 and B4-size documents are inserted continuously, as illustrated in FIG. 2, if the A4-size document is first inserted into the document tray, the CPU of the facsimile drives the document feed roller 14 upon detection of the document by the document detection sensor 12 so as to feed the A4-size document up to the scan stand-by line D1. As the document position sensor 16 detects the document, the CPU stops driving the document feed roller 14 to detect the document size. At this moment, since the B4-size document sensor 20 detects the B4-size document put on the document tray 10, the CPU controls the scanner to scan the area corresponding to the B4-size document. Furthermore, if the called facsimile cannot receive the B4-size document, the facsimile scales down the scanned image before transmitting it to the called facsimile.

As described above, the CPU misrecongnizes the A4-size document for the B4-size document, thereby scanning the area corresponding to the B4-size document. Accordingly, the scanner scans an unnecessary area. Furthermore, if the called facsimile cannot receive the B4-size document, the facsimile scales down the scanned image before transmitting so that the transmission time is increased and the image is degraded.

Figure 3:
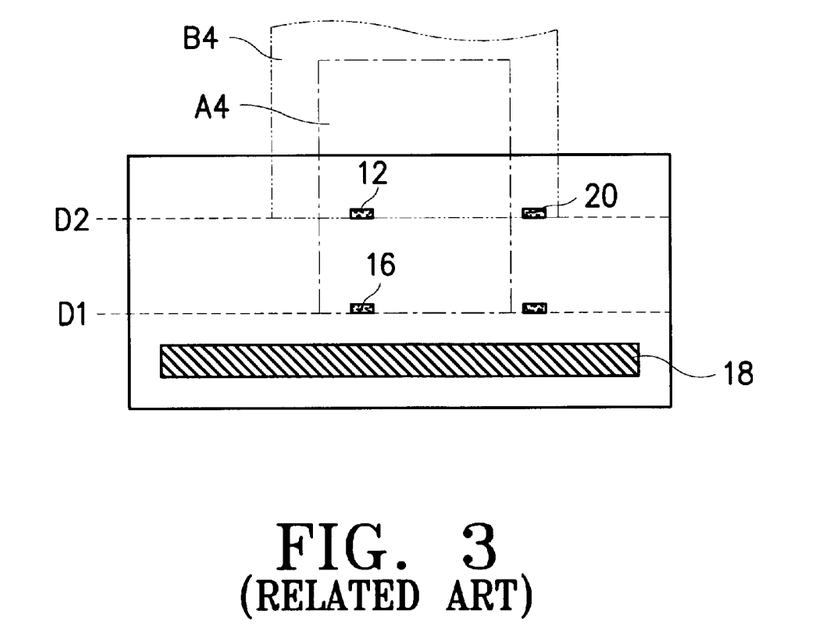

In order to accurately detect the document size, an improved facsimile further includes a B4-size document sensor 22 positioned at a specific place on the scan stand-by position D1, as illustrated in FIG. 3. However, addition of the B4-size document sensor 22 to the facsimile causes an increase in the cost of the facsimile.

Although the present invention is applicable to a facsimile having a scanner capable of scanning a document of various sizes, the following description will be restricted to a facsimile having a scanner capable of scanning a document smaller than B4 size, for the convenience of explanation.

Figure 4:
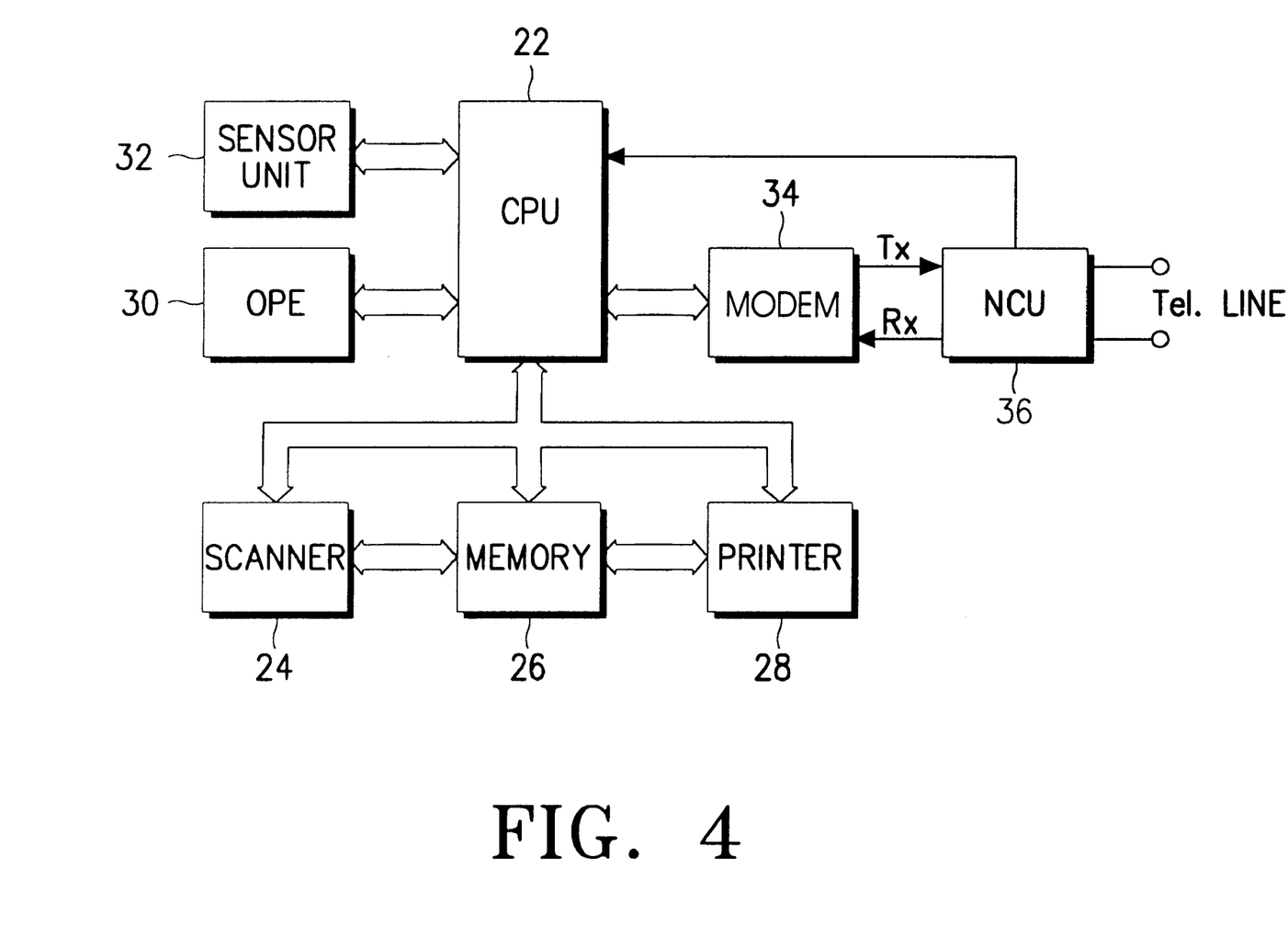
FIG. 4 is a block diagram of a facsimile apparatus.

FIG. 4 illustrates a block diagram of a further facsimile. In the drawing, a central processing unit (CPU) 22 controls overall operation of the facsimile according to a program stored in a memory 26. The memory 26 stores the operation program of the CPU 22, a protocol control program and various reference data, and temporarily stores data generated in the process of executing the operation program of the CPU 22. A scanner 24 scans the document and provides the CPU 22 with the image data of the document. In particular, the scanner 24 includes an image sensor capable of scanning a document smaller than A4 size. The image data output from the scanner 24 is processed by the CPU 22 and stored in the memory 26. The image data stored in the memory 26 is transferred to the called facsimile by a MODEM (modulator-demodulator) 34, or is printed by a printer 28. The printer 28 prints the image on recording paper under the control of the CPU 22.

Operating panel equipment (OPE) 30 includes a number of numeric keys, function keys and arrow keys, and a display. The operating panel equipment 30 provides the CPU 22 with key data according to key input by the user, and displays operational status of the facsimile on the display. A sensor unit 32 detects states of the document and recording paper and provides the CPU 22 with the detected state information. In particular, the sensor unit 32 includes a document detection sensor 12, a B4-size document sensor 38, and a document position sensor 16 according to the present invention.

The MODEM 34 modulates the output data of the CPU 22 and the image data into analog signals and transmits the modulated signals through a network control unit (NCU) 36. Modem 34 also demodulates received analog signals. The NCU 36 forms a communication line between the MODEM 34 and a transmission path (i.e., a telephone line).

Figure 5:
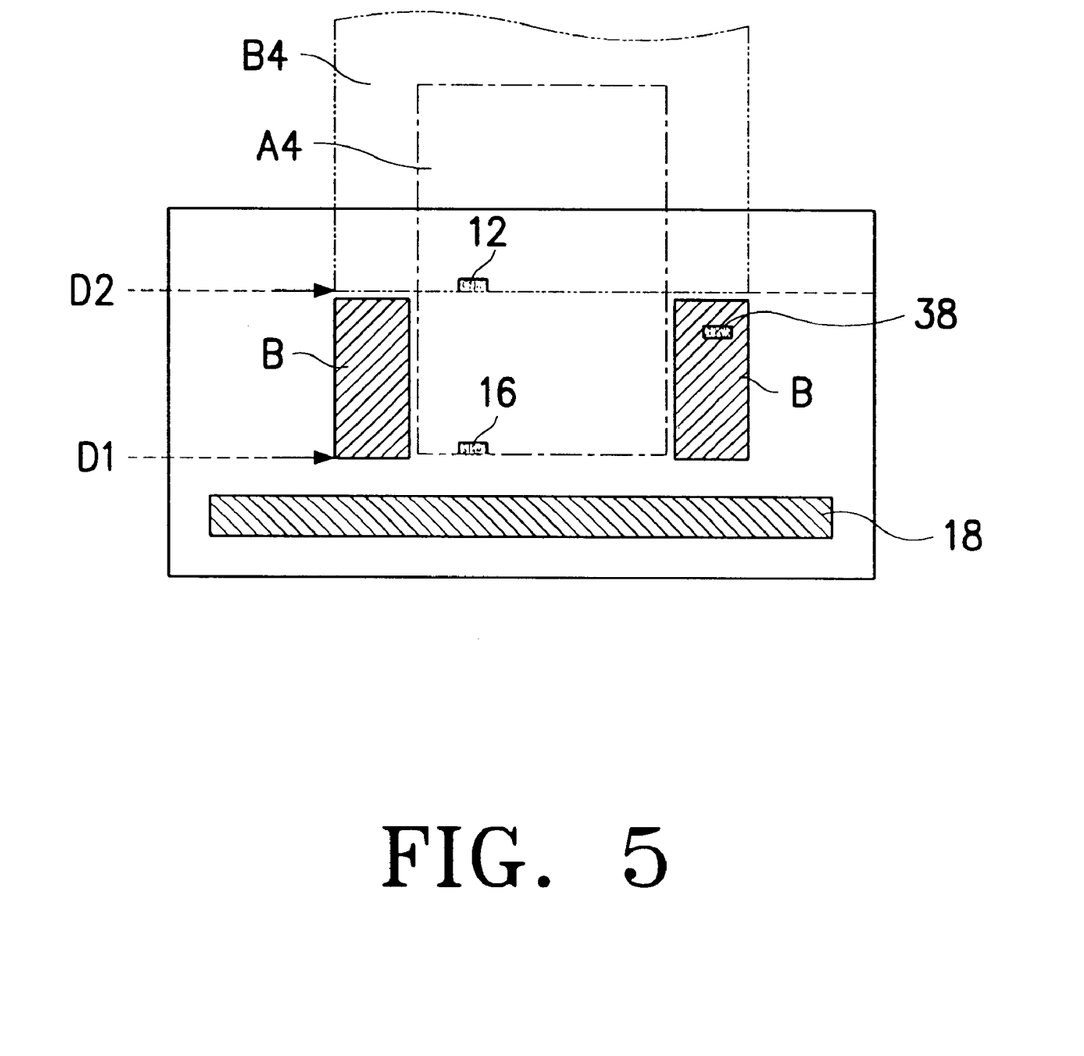
FIG. 5 is a diagram of a document size detection device according to a preferred embodiment of the present invention.

FIG. 5 illustrates a document feed path of the facsimile which includes a document size detection sensor 38 according to a preferred embodiment of the present invention. In the facsimile illustrated in FIG. 5, the document detection sensor 12 is placed on a document insertion line D2. Further, the B4-size document sensor 38 is mounted at a specific place between the document insertion line D2 and the scan stand-by line D1, and within an area B formed between lateral boundaries of A4 and B4-size documents. When a document larger than A4 size is inserted in the document tray 10 the B4-size document sensor 38 takes the inserted document for a B4-size document. Thus, even though a plurality of the documents in different sizes are inserted continuously, the facsimile can detect accurate sizes of the individual documents. Further, the document position sensor 16 is positioned at a specific place on a scan stand-by line D1.

Figure 6:
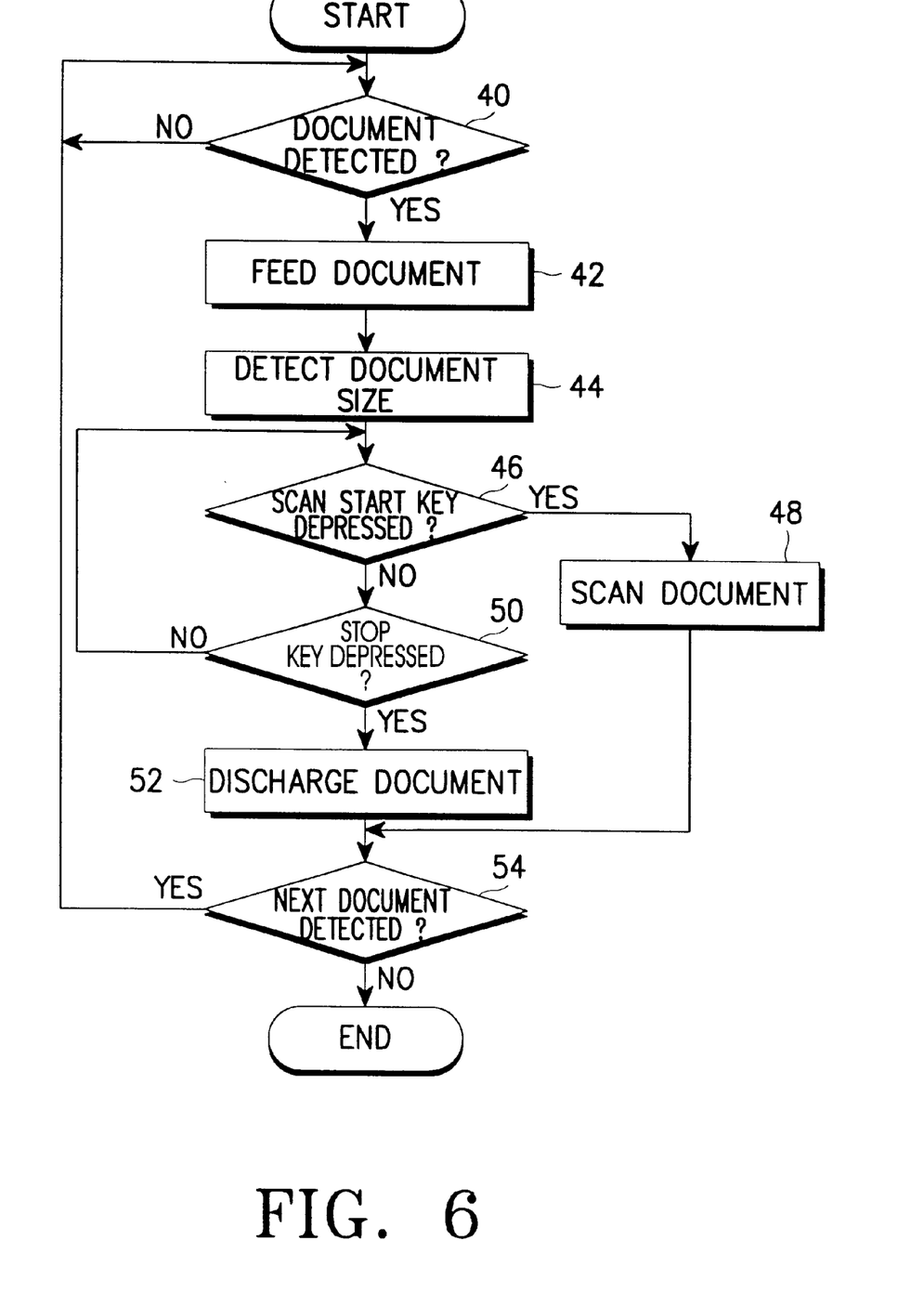
FIG. 6 is a flow chart for scanning a document according to a preferred embodiment of the present invention.

FIG. 6 shows a flow chart for scanning the document and transmitting the scanned image data in a facsimile having the B4-size document sensor 38.

Now, referring to FIGS. 4 through 6, the preferred embodiment of the present invention will be described in detail. As the document detection sensor 12 detects the document put in the document tray 10, the CPU 22 starts the program shown in FIG. 6.

Referring to FIG. 6, the CPU 22 checks at step 40 whether or not the document detection sensor 12 has detected the document put in the document tray 10. If the document detection sensor 12 has detected the document, the CPU 22 at step 42 drives the main motor to drive the document feed roller 14 shown in FIG. 1, so as to feed the document up to the scan stand-by line D1. If the document position sensor 16 positioned at the scan stand-by line D1 detects the document being fed, the CPU 22 stops driving the main motor to stop feeding the document. When the document reaches the scan stand-by line D1, the CPU 22 checks at step 44 whether or not the B4-size document sensor 38 has detected the document being fed. If the B4-size document sensor 38 has detected the document being fed the CPU 22 takes it for a B4-size document; otherwise, CPU 22 takes it for an A4-size document.

After completion of detection of the document size, the CPU checks at step 46 as to whether or not the user has depressed a scan start key, such as the facsimile transmission key or the copy key on the operating panel equipment 30. If the scan start key is depressed, the CPU 22 scans (at step 48) the area corresponding to the document size detected at step 44. However, if the scan start key is not depressed, the CPU 22 checks (at step 50) whether or not the user has depressed a stop key on the operating panel equipment 30. If the stop key is not depressed, the procedure returns to step 46. However, if the stop key is depressed, the CPU 22 discharges the document at step 52.

After completion of steps 48 and 52, the CPU 22 checks (at step 54) as to whether or not the document detection sensor 12 has detected the next document. If the document detection sensor 12 has detected the next document, the CPU 22 returns to step 40. However, if the document detection sensor 12 has not detected the next document, the CPU 22 completes the scanning. After completion of the scanning, the CPU 22 transmits the scanned image data to the called facsimile at the request of the user.

In light of the foregoing, the present invention is also applicable to a facsimile having a scanner capable of scanning A3 or letter size document. In case of the A3 size scanner, an A3-size document sensor should be mounted at a specific place between the document insertion line D2 and the scan stand-by line D1, and within an area formed between the lateral boundaries of B4 and A3-size documents. As a result, if an inserted document is larger than the B4-size document, the A3-size document sensor will take the inserted document for an A3-size document.

As described above, the document size detection device of the invention can accurately detect the document size while reducing the number of document size detection sensors required.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A document size detection device, comprising:
   document detection sensor means positioned at a first location on a document insertion line across a document feed path for detecting a document, said first location being positioned within a width of a first-sized document;
   document position sensor means positioned at a second location on a scan stand-by line across the document feed path for sensing a position of the document, said second location being positioned within the width of said first-sized document;
   document size detection sensor means positioned at a third location between said document insertion line and said scan stand-by line, and within an area formed between lateral boundaries of said first-sized document and a second-sized document, for detecting a size of the document;
   document feed roller means for feeding the document; and
   controller means for controlling said document feed roller means to feed the document up to said scan stand-by line if said document detection sensor means detects the document;
      wherein said controller means determines the document to be said first-sized document if said document size detection sensor means does not detect the document; and
      wherein said controller means determines the document to be said second-sized document if said document size detection sensor means detects the document.

2. The document size detection device as claimed in claim 1, wherein said second-sized document is larger than said first-sized document.

3. A document size detection device, comprising:
   document detection sensor means positioned at a first location on a document insertion line across a document feed path for detecting a document, said first location being positioned within a width of a first-sized document;
   document position sensor means positioned at a second location on a scan stand-by line across the document feed path for sensing a position of the document, said second location being positioned within the width of said first-sized document;
   first document size detection sensor means positioned at a third location between said document insertion line and said scan stand-by line, and within an area formed between lateral boundaries of said first-sized document and a second-sized document, for detecting a size of the document;
   second document size detection sensor means positioned at a fourth location between said document insertion line and said scan stand-by line, and within an area formed between lateral boundaries of said second-sized document and a third-sized document, for detecting a size of the document;
   document feed roller means for feeding the document; and
   controller means for driving said document feed roller means to feed the document up to said scan stand-by line if said document detection sensor means detects the document;
   wherein said controller means determines the document to be said third-sized document if said second document size detection sensor means detects the document;
   wherein said controller means determines the document to be said second-sized document if said second document size detection sensor means does not detect the document and said first document size detection sensor means detects the document; and
   wherein said controller means determines the document to be said third-sized document if said first and second document size detection sensors means both fail to detect the document.

4. The document size detection device as claimed in claim 3, wherein said third-sized document is larger than said second-sized document, and said second-sized document is larger than said first-sized document.

5. A document size detection device, comprising:
   document size detection sensor means positioned at a location between a document insertion line and a scan stand-by line, and within an area formed between lateral boundaries of a first-sized document and a second-sized document, for detecting a size of the document along a document feed path line;
   document feeding means for feeding the document; and
   controller means for controlling said document feeding means to feed the document up to said scan stand-by line;
   wherein said controller means determines the document to be said first-sized document if said document size detection sensor means does not detect the document; and
   wherein said controller means determines the document to be said second-sized document if said document size detection sensor means detects the document; wherein:
   said document insertion line is a line within the device, normal to the document feed path line of the device, and at which document feeding begins if a document is detected at said document insertion line; and
   said scan stand-by line is a line within the device, normal to the document feed path line of the device, and at which scanning of the document commences if a scan start key has been depressed.

6. The document size detection device as claimed in claim 5, wherein said second-sized document is larger than said first-sized document.

7. The document size detection device as claimed in claim 5, further comprising:
   additional document size detection sensor means positioned at an additional location between said document insertion line and said scan stand-by line, and within an area formed between lateral boundaries of said second-sized document and a third-sized document, for detecting a size of the document;
   wherein said controller means determines the document to be said first-sized document if said document size detection sensor means and said additional document size detection sensor means both fail to detect the document;
   wherein said controller means determines the document to be said second-sized document if said document size detection sensor means detects the document and said additional document size detection sensor means does not detect the document; and
   wherein said controller means determines the document to be said third-sized document if said additional document size detection sensor means detects the document.

8. The document size detection device as claimed in claim 7, wherein said third-sized document is larger than said second-sized document, and said second-sized document is larger than said first-sized document.

9. In a method of operating a facsimile machine, said facsimile machine having a travel axis along which documents travel through the facsimile machine and having a transverse axis normal to the travel axis and lying in a plane in which the documents travel, said method comprising the steps of:
   determining whether a scan start key has been depressed by a user; when said scan start key is depressed by said user, scanning said document; when said scan start key is not depressed by said user, determining whether a stop key has been depressed by the user; when said stop key is not depressed by said user, returning to said step of determining whether said scan start key has been depressed by said user; and when said stop key is depressed by said user, discharging the document;
   the improvement comprising the additional steps of:
   (1) inserting a document into the facsimile machine at a document insertion line on the facsimile machine, a document detection sensor being positioned at the document insertion line, the document detection sensor adapted for detecting insertion of a document into the facsimile machine and thereupon sending a signal to a controller adapted to cause the document to be transported along the travel axis further into the facsimile machine to a scan stand-by line, the scan stand-by line being positioned with respect to the travel axis at a location within the facsimile machine where line-by-line scanning of documents begins;
   (2) transporting the document along the travel axis to the scan stand-by line, and past a document size detection sensor positioned with respect to the travel axis at a location between the document insertion line and the scan stand-by line, said document size detection sensor positioned with respect to the transverse axis within an area formed between transverse boundaries of a first-sized document and a second-sized document, the document size detection sensor adapted for detecting whether a portion of a document is positioned above the document size detection sensor; and (3) determining a document to be a first-sized document if said document size detection sensor does not detect the document, and determining the document to be a second-sized document if the document size detection sensor detects the document.

10. The document size detection method as claimed in claim 9, further comprising the step of providing an additional document size detection sensor positioned at a further location between said document insertion line and said scan stand-by line; and wherein said step of detecting said document size further comprises determining the document to be said first-sized document if said document size detection sensor and said additional document size detection sensor both fail to detect the document, and determining said document to be said second-sized document if said document size detection sensor detects the document and said additional document size detection sensor does not detect the document, and determining the document to be a third-sized document if said additional document size detection sensor detects the document.

11. The document size detection method as claimed in claim 10, wherein said additional document size detection sensor is positioned within an area formed between lateral boundaries of said second-sized document and said third-sized document.

12. The document size detection method as claimed in claim 9, wherein said document size detection sensor is positioned within an area formed between lateral boundaries of said first-sized document and said second-sized document.

13. In a method of operating a facsimile machine, said facsimile machine having a travel axis along which documents travel through the facsimile machine and having a transverse axis normal to the travel axis and lying in a plane in which the documents travel, said facsimile machine having a document insertion line at which is positioned a document detection sensor, the document detection sensor adapted for detecting insertion of a document into the facsimile machine and thereupon sending a signal to a controller adapted to cause the document to be transported along the travel axis further into the facsimile machine to a scan stand-by line, the scan stand-by line being positioned with respect to the travel axis at a location within the facsimile machine where line-by-line scanning of documents begins, an improved method of determining document size, said improved method comprising the steps of:

(1) providing a document size detection sensor positioned with respect to the travel axis at a location between the document insertion line and the scan stand-by line, said document size detection sensor positioned with respect to the transverse axis within a zone between transverse boundaries of a first-size document and a second-size document;

(2) determining a document to be a first-sized document when and only when said document size detection sensor does not detect the document; and (3) determining the document to be a second-sized document when and only when the document size detection sensor detects the document.

14. The document size detection method as claimed in claim 13, further comprising the steps of:

determining whether a scan start key has been depressed by a user;

when said scan start key is depressed by said user, scanning said document; and when said scan start key is not depressed by said user, determining whether a stop key has been depressed by the user.

15. The document size detection method as claimed in claim 14, further comprising the steps of:

when said stop key is not depressed by said user, returning to said step of determining whether said scan start key has been depressed by said user; and when said stop key is depressed by said user, discharging the document.

16. The document size detection method as claimed in claim 13, further comprising the steps, prior to said step of determining the document to be a first-sized document, of:

determining whether the document has been detected; and when said document has been detected, feeding the document through a document feed path to the scan stand-by line at which said document size is detected.

17. The document size detection method as claimed in claim 13, further comprising the step of providing an additional document size detection sensor positioned at a further location between said document insertion line and said scan stand-by line; and wherein the document is determined to be said first-sized document when said document size detection sensor and said additional document size detection sensor both fail to detect the document, said document is determined to be said second-sized document when said document size detection sensor detects the document and said additional document size detection sensor does not detect the document, and the document is determined to be a third-sized document when said additional document size detection sensor detects the document.

18. The document size detection method as claimed in claim 13, wherein said document size detection sensor is positioned within an area formed between lateral boundaries of said first-sized document and said second-sized document.

\* \* \* \* \*